United States Patent [19]

Conner, Sr.

[11] 4,116,701

[45] Sep. 26, 1978

[54] METAL CORROSION INHIBITOR

[76] Inventor: Alvin J. Conner, Sr., P.O. Box 8118, New Orleans, La. 70182

[21] Appl. No.: 775,425

[22] Filed: Mar. 8, 1977

[51] Int. Cl.$^2$ .............................................. C09D 5/08
[52] U.S. Cl. ................................... 106/14.14; 422/7; 252/390; 252/394; 252/396
[58] Field of Search .......................... 106/14; 21/2.5 B; 252/390, 394, 396

[56] References Cited

U.S. PATENT DOCUMENTS

| | | | |
|---|---|---|---|
| 2,512,949 | 6/1950 | Lieber | 106/14 |
| 2,739,871 | 3/1956 | Senkus | 21/2.5 |
| 2,775,533 | 12/1956 | Healy | 106/14 |
| 2,829,080 | 4/1958 | Fessler et al. | 21/2.5 B |

*Primary Examiner*—Lorenzo B. Hayes
*Attorney, Agent, or Firm*—Armstrong, Nikaido, Marmelstein & Kubovcik

[57] ABSTRACT

A metal corrosion inhibitor and method of its application are provided. The inhibitor is a composition prepared by adding an alkali metal nitrite, ammonium benzoate, an alkylalkanolamine and a nitrogenous base such as urea to water. The inhibitor is applied as a mist or spray to the exposed edges of coiled and cut length sheets of steel to protect the steel during storage and is fogged into shipping containers or vehicles to protect the steel during shipping.

5 Claims, No Drawings

METAL CORROSION INHIBITOR

BACKGROUND OF THE INVENTION

1. Field of the Invention

The present invention relates to a corrosion inhibitor for metals, particularly steel, and to a method of employing the inhibitor.

2. Description of the Prior Art

So-called volatile corrosion inhibitors which inhibit the corrosion of metal surfaces are widely known in the art. These compositions, which inhibit the corrosive elements normally existing in the atmosphere by a vaporizable substance in the vicinity of the metal surface to be protected, are disclosed, inter alia, in U.S. Pat. Nos. 2,521,311; 2,577,219; 2,643,177; 2,739,870; 2,739,871; 2,739,872; 2,829,945 and 3,779,818.

Typically, these compositions are applied by spraying the entire surface of the metal article to be protected or the metal article is enclosed, packaged or surrounded in or with materials containing, e.g., coated with or impregnated with, the volatile corrosion inhibitor.

The corrosion inhibitors presently used commercially, however, have various disadvantageous. Thus, for example, one of the most commonly used volatile corrosion inhibitors, dicyclohexylamine nitrite (DICAM), is only very slightly soluble in water but is soluble in 37% methyl alcohol/63% water; 31% ethyl alcohol/69% water or 30% isopropanol/70% water mixtures. Solutions of the DICAM in these mixtures cannot be sprayed safely because an explosive atmosphere may be created and because of the toxic and intoxicating nature of the alcohol component. Furthermore, on drying or evaporation of the mixtures, the DICAM remains as a white residue which detracts from the physical appearance of the metal article.

Another commonly used corrosion inhibitor is the reaction product of dicyclohexyl amine or of morpholine with a short chain fatty acid such as caprylic, stearic or caproic acid. These inhibitors, however, are only partly effective and have high residual odor levels that are objectionable.

Other known corrosion inhibitors are either ineffective, too expensive for industrial application, or produce objectionable residues or form unsafe or unpleasant atmospheres.

It is an object of the present invention, therefore, to provide a volatile corrosion inhibitor which avoids or minimizes the disadvantages of the inhibitors presently employed in industrial applications.

This and other objects of the invention will be apparent from the following summary and description of preferred embodiments of the invention.

SUMMARY OF THE INVENTION

According to the present invention there is provided a volatile corrosion inhibitor for metal which is an aqueous solution of (a) an alkali metal nitrite; (b) ammonium benzoate, (c) an amino substituted alkylalkanolamine and (d) a nitrogenous base.

The metal corrosion inhibitor according to this invention is essentially odorless and does not leave an objectionable residue and when applied to the edges of a metal article and fogged in the container or vehicle for the metal article effectively prevents corrosion of the article.

DESCRIPTION OF PREFERRED EMBODIMENTS

The volatile metal corrosion inhibitor according to the present invention is prepared by adding an alkali metal nitrite, ammonium benzoate, an alkylalkanolamine and a nitrogenous base to water.

The alkali metal nitrite can be any of the alkali metal nitrites including sodium, potassium and lithium nitrite. Sodium nitrite is typically employed in the preferred compositions according to the present invention because of its availability and relatively low cost.

The amino substituted alkylalkanolamines useful according to the present invention are those of the general formula:

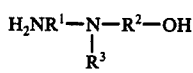

where $R^1$ and $R^2$ are independently alkylidene of 1-4 carbon atoms and $R^3$ is hydrogen or alkyl of 1-4 carbon atoms.

Amino substituted alkylalkanolamines according to the general formula having utility in preparing the volatile metal corrosion inhibitor compositions according to the present invention include aminomethylethanolamine, aminoethylethanolamine, dimethylaminopropanolamine and the like. Aminoethylethanolamine has been found to be particularly suitable in preparing the volatile metal corrosion inhibitor.

The nitrogenous base may be any such base which will buffer and stabilize the aqueous solution according to the present invention. Typical of such bases are diamides of the formula:

where R is independently hydrogen or alkyl of 1-6 carbon atoms, which is intended to include urea, biuret and the like or N-substituted ureas and unsymmetrical ureas such as N,N-dibutyl urea; N-butyl urea; N-propyl urea, dimethyl urea, tertiary butyl urea, ethyl butyl urea and the like. A carbamate, guanidine or diguanidine are also believed to be useful as the nitrogenous base. Of particular utility is urea.

The alkali metal nitrite, ammonium benzoate, alkylalkanolamine and nitrogenous base are added to water in an amount of up to about 25% by weight based on the total weight of these compounds and the water. If the amount exceeds about 25% by weight, salting out or separation may occur during storage or use and the residue deposited on the metal surface after evaporation of the water may be too heavy. Particularly useful as the volatile metal corrosion inhibitor solutions according to the present invention are those prepared employing:

5-12 parts by weight alkali metal nitrite,
2-6 parts by weight ammonium benzoate,
4-10 parts by weight alkylalkanolamine, and
4-10 parts by weight nitrogenous base;

the total parts of these compounds being up to about 25 parts by weight and the amount of water being the difference between the total parts of the above compounds and 100 parts by weight. A particularly effective composition is prepared from about 5.2% urea, 6.3% sodium nitrite; 3.1% ammonium benzoate; 5.2% aminoethylethanolamine and 80.2% water.

When the alkali metal nitrite, ammonium benzoate, amino substituted alkylalkanolamine and nitrogenous base are combined in water to form the volatile corrosion inhibitor according to the present invention it is believed that ammonium nitrite is formed as an intermediate and reacts with the alkylalkanolamine to form a nitrite of the alkylalkanolamine with the evolution of ammonia. It appears that the components of the inhibitor may be added to the water in any desired sequence. Typically, the inhibitor is prepared by: (1) dissolving the alkali metal nitrite in the water; (2) adding the ammonium benzoate to the resulting solution; (3) adding the alkylalkanolamine to the solution formed in (2); and (4) adding the nitrogenous base to stabilize the solution. The preparation of the inhibitor is generally carried out at ambient temperature. The relative amounts of the alkali metal nitrite, ammonium benzoate and alkylalkanolamine combined to form the volatile corrosion inhibitor according to the present invention may vary within the ranges specified above. The specific volatile corrosion inhibiting properties of the inhibitor will vary somewhat depending on the particular composition and may be readily determined by the art-skilled person. The nitrogenous base should be employed in an amount of from about 0.75 to about 1.2 parts by weight per part by weight of the alkali metal nitrite and such that the pH of the resultant solution remains above about 8. Because of the ammonia formed during the preparation of the inhibitor, the initial pH is high, i.e., above about 11. As the ammonia escapes, however, the pH decreases and stabilizes at about 9. The proper pH will be maintained, however, by combining the components of the inhibitors in the amounts specified above. The aminoethylethanolamine nitrite which is believed to be formed in the solution is stable and slightly volatile at temperatures up to about 150° F.

Although the volatile metal corrosion inhibitor according to the present invention may be applied directly to the surfaces of steel and other metals including cadmium and zinc by spraying or may be impregnated into paper, cloths, fiber boards, pads and the like or coated on papers, plastics and the like and the metals shipped in containers with or wrapped with these materials, best corrosion inhibition has been obtained by treating the exposed edges of the metal, e.g., coiled sheet and cut length sheet, and by fogging containers or shipping vehicles for the metals after loading has been completed and the securing of doors, covers, lids, etc., is performed.

The treating of the exposed edges of coiled sheet and cut length sheet protects the metal in the storage area before shipment is made. The inhibitor is applied as a mist or fog to the metal after it has been strapped or secured and after coiling or shearing operations. Only sufficient inhibitor is applied on the edges so that the flat surface of the coils or the face of the sheets remain dry. As will be appreciated by those skilled in the art, the amount of inhibitor required for treating the exposed edges will vary depending on the concentration and composition of the inhibitor, the type of metal to be treated, etc. Amounts of about one milliliter of inhibitor per square foot of exposed edge which is equivalent to about 3 ounces per 5 ton coil or stack of cut length sheets have been found to be sufficient for the treatment of steel with the metal corrosion inhibitors according to the present invention.

During shipment, the metal is further protected by fogging the entire container or shipping vehicle for the metal after the metal has been loaded and the container or vehicle tightly secured. A relatively small amount of the inhibitor is injected as a fog into a container or vehicle such as a railroad boxcar, truck or barge so as to completely fill the volume of the container or vehicle. The water vapor present in the atmosphere surrounding the metal is thereby saturated and inhibited so that if and when condensation occurs, the condensate will be inhibited. The amount of the inhibitor fogged into the volume of a shipping vehicle is typically about 20 milliliters per 100 cubic feet of volume. The fact that the fogging of a storage vehicle with an inhibitor solution which is essentially 80% water provides effective protection of metal surfaces against rusting is itself surprising but has been proven by laboratory and field tests. To demonstrate the effectiveness of the volatile corrosion inhibitor according to the present invention as compared to known corrosion inhibitor compositions when employed as a fog, the compositions of Table I were prepared and evaluated according to the following procedure. ½-Gallon wide mouth commercial jars with metal screw-type lids or caps with paper cardboard liners were adapted for testing by removing the liners from the lids and punching ⅛-inch holes in the liners. Clean, new, 40 penny nails were polished with steel wool and then examined under a microscope for rust, especially on the point, and were inserted into the holes and the liners with the nails were reinserted in the lids. The jars were then filled with distilled water to completely wet the interior of the jars and then all the water was poured out. The jars were empty but wet on the interior. The solutions to be evaluated were then poured into 1 quart plastic bottles having trigger pump type sprayers. The sprayers were then operated until the units were primed and each squeeze of the trigger produced a very fine mist. The noses of the triggers were held 2 inches above the jars and the triggers were squeezed three times (this procedure produced ½ ml of fog or mist within each jar). The lids with the clean, rust free nails suspended from the lids were immediately screwed on the jars. Each of the jars, therefore, had 100% relative humidity and an inhibitive vapor. Each material under test was coded, identified and the components recorded. The jars with nails were stored at 90° F. and examined weekly for rust. (The initial formation of rust will be on the point). After 8 weeks or 1,344 hours the nails were evaluated for the relative amounts of rust and were rated according to a scale of 1 (little or no rust) to 5 (excessive rust). In quantitative terms the ratings, which are determined by visual inspection, are defined in approximate terms as follows:

Rating #1—less than 5% of surface area covered with rust.

Rating #2—5 to 10% of surface area covered with rust.

Rating #3—10 to 25% of surface area covered with rust.

Rating #4—25 to 50% of surface area covered with rust.

Rating #5—greater than 50% of surface area covered with rust.

TABLE I

| Ex. No. | Solids Composition | % Solids | % Solvent | Solvent Composition | Rating |
|---|---|---|---|---|---|
| 1 | Control | 0 | 100% | Water | 5 |
| 2 | Dicyclohexylamine nitrite | 10 | 90 | 30% Isopropanol 70% water | 2 |
| 3 | Diisopropylamine nitrite | 10 | 90 | Water | 3 |
| 4 | Urea 50% sodium nitrite 50% | 15 | 85 | Water | 3 |
| 5 | Urea 40% sodium nitrite 40% ammonium benzoate 20% | 15 | 85 | Water | 3 |
| 6 | Monoethanolamine benzoate | 15 | 85 | Water | 3 |
| 7 | Imidiazol | 10 | 90 | Water | 2 |
| 8 | Morpholine nitrite | 15 | 85 | Water | 3 |
| 9 | Dicyclohexylamine benzoate | 15 | 85 | Water 70% Isopropanol 30% | 4 |
| 10 | Dicyclohexylamine caprylate | 10 | 90 | Water 70% Isopropanol 30% | 2 |
| 11 | Morpholine caprylate | 10 | 90 | Water | 3 |
| 12 | Dicyclohexylamine nitrite 50% Diisopropylamine nitrite 50% | 20 | 80 | Water 70% Isopropnaol 30% | 2 |
| 13 | Ammonium benzoate | 15 | 85 | Water | 4 |
| 14 | Imidiazol 25%, ammonium benzoate 25% sodium nitrite 50% | 15 | 85 | Water | 2 |
| *15 | Urea 25%, ammonium benzoate 25%, sodium nitrite 25%, aminoethylethanolamine 25% | 15 | 85 | Water | 1 |
| *16 | Urea 30%, sodium nitrite 30%, ammonium benzoate 15%, aminoethylethanolamine 25% | 15 | 85 | Water | 1 |
| 17 | Urea 25%, sodium nitrite 35%, ammonium benzoate 15%, monoisopropanolamine 25% | 15 | 85 | Water | 2 |
| *18 | Guanidine 25%, sodium nitrite 25%, ammonium benzoate 25%, aminoethylethanolamine 25% | 15 | 85 | Water | 1 |
| *19 | Urea 25%, sodium nitrite 25%, ammonium benzoate 25%, dimethylaminopropanolamine 25% | 15 | 85 | Water | 1 |
| *20 | Aminomethylethanolamine 25%, urea 30%, sodium nitrite 30%, ammonium benzoate 15% | 15 | 85 | Water | 1 |
| 21 | Sodium nitrite 60%, ammonium bicarbonate 40% | 20 | 80 | Water | 3 |
| 22 | Sodium nitrite 60%, ammonium hydroxide 40% | 35 | 65 | Water | 3 |
| *23 | Aminoethylethanolamine 15%, sodium nitrite 35%, urea 35%, ammonium benzoate 15% | 15 | 85 | Water | 1 |

Note:
All compositions with ratings of 2 or lower were repeated for confirmation of results. Asterisks indicate compositions according to the present invention.

It can be seen, therefore, that the volatile corrosion inhibitors according to the present invention provide effective protection against corrosion of metal surfaces. The inhibitors are aqueous based, non-toxic and non-inflammable and enable the safe use of spraying or fogging methods of application.

Although the invention has been described in conjunction with certain preferred embodiments thereof, it is not intended to be limited thereto, but instead includes all those embodiments within the scope and spirit of the appended claims.

What is claimed is:

1. A volatile metal corrosion inhibitor prepared by adding to water, by weight:
   (a) 5–12 parts of an alkali metal nitrite;
   (b) 2–6 parts of ammonium benzoate;
   (c) 4–10 parts of an alkylalkanolamine of the formula:

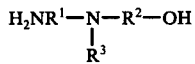

where $R^1$ and $R^2$ are independently alkylidene of 1–4 carbon atoms and $R^3$ is hydrogen or alkyl of 1–4 carbon atoms, and
   (d) 4–10 parts of a nitrogenous base selected from the group consisting of diamides of the formula:

where R is independently hydrogen or alkyl of 1–6 carbon atoms; carbamates, guanidine and diguanidine; the total amount of (a)–(d) and water being 100 parts and the total amount of (a), (b), (c) and (d) being not greater than 25 parts per said 100 parts.

2. The metal corrosion inhibitor of claim 1 wherein the diamide is urea.

3. The metal corrosion inhibitor of claim 2 wherein the alkali metal nitrite is sodium nitrite.

4. The metal corrosion inhibitor of claim 3 wherein the alkylalkanolamine is aminoethylethanolamine.

5. The metal corrosion inhibitor of claim 4 prepared by adding to said water about:
   (a) 6.3 parts of sodium nitrite;
   (b) 3.1 parts of ammonium benzoate;
   (c) 5.2 part of aminoethylethanolamine; and
   (d) 5.2 parts of urea.

* * * * *